United States Patent
Geiselhart et al.

(10) Patent No.: US 11,579,589 B2
(45) Date of Patent: Feb. 14, 2023

(54) SELECTIVELY ACTIVATING A RESOURCE BY DETECTING EMOTIONS THROUGH CONTEXT ANALYSIS

(71) Applicant: International Business Machines Corporation, Armonk, NY (US)

(72) Inventors: Reinhold Geiselhart, Rottenburg-Ergenzingen (DE); Verena Henrich, Griesheim (DE); Alexander Lang, Stuttgart (DE); Magdalena Leshtanska, Leinfelden-Echterdingen (DE)

(73) Assignee: International Business Machines Corporation, Armonk, NY (US)

( * ) Notice: Subject to any disclaimer, the term of this patent is extended or adjusted under 35 U.S.C. 154(b) by 1148 days.

(21) Appl. No.: 16/170,833

(22) Filed: Oct. 25, 2018

(65) Prior Publication Data

US 2020/0133238 A1 Apr. 30, 2020

(51) Int. Cl.
*G05B 19/4155* (2006.01)
*G06F 40/30* (2020.01)
(Continued)

(52) U.S. Cl.
CPC ......... *G05B 19/4155* (2013.01); *G06F 40/20* (2020.01); *G06F 40/30* (2020.01); *G06V 40/174* (2022.01); *G05B 2219/33056* (2013.01)

(58) Field of Classification Search
CPC ........ G06F 40/20; G06F 40/279; G06F 40/30; G05B 19/4155; G05B 2219/33056; G06K 9/00536; G06K 9/627; G06V 40/174
See application file for complete search history.

(56) References Cited

U.S. PATENT DOCUMENTS 6,622,140 B1 * 9/2003 Kantrowitz ........... G06F 16/353
707/999.005
7,627,475 B2  12/2009 Petrushin
(Continued)

OTHER PUBLICATIONS

Rajadesingan et al. Sarcasm Detection on Twitter: A Behavioral Modeling Approach. WSDM'15, Feb. 2-6, 2015, Shanghai, China. http://dx.doi.org/10.1145/2684822.2685316. 10 pages. (Year: 2015).*
(Continued)

*Primary Examiner* — Amy M Levy
(74) *Attorney, Agent, or Firm* — Maeve M. Carpenter

(57) ABSTRACT

A method selectively activates a resource to accommodate an advanced emotion. A supervisor computer receives a first piece of content, and then applies an emotion classifier to the first piece of content in order to create a first concept/emotion/sentiment/time tuple. The supervisor computer creates a second concept/emotion/sentiment/time tuple for a second piece of content, and compares the first and second tuples. If the concept in the first piece of content matches the concept in the second piece of content but that at least one of the emotion, sentiment, and time of the first piece of content does not match the emotion, sentiment, and time of the second piece of content, the supervisor computer determines that the emotion of the second piece of content is an advanced emotion that is not expressed by the first or second pieces of content, and activates a resource that accommodates the advanced emotion.

20 Claims, 9 Drawing Sheets

(51) Int. Cl.
*G06V 40/16* (2022.01)
*G06F 40/20* (2020.01)

(56) References Cited

U.S. PATENT DOCUMENTS

| | | | |
|---|---|---|---|
| 8,600,734 B2 | 12/2013 | Warner | |
| 8,781,991 B2 | 7/2014 | Lee | |
| 9,031,293 B2 | 5/2015 | Kalinli-Akbacak | |
| 9,681,166 B2 | 6/2017 | Naveh | |
| 9,788,777 B1 | 10/2017 | Knight et al. | |
| 9,836,756 B2 | 12/2017 | Rider et al. | |
| 2014/0052842 A1* | 2/2014 | Gangadharaiah | G06Q 50/01 709/224 |
| 2014/0095148 A1 | 4/2014 | Berjikly et al. | |
| 2014/0337072 A1* | 11/2014 | Tamblyn | G06Q 10/06311 705/7.13 |
| 2016/0072903 A1* | 3/2016 | Chakra | H04L 51/52 704/9 |
| 2016/0117591 A1* | 4/2016 | Naik | G06F 40/242 707/752 |
| 2017/0083506 A1* | 3/2017 | Liu | G06V 40/174 |
| 2017/0118079 A1* | 4/2017 | Baughman | H04L 67/52 |
| 2018/0012230 A1 | 1/2018 | Feigenblat et al. | |
| 2018/0061415 A1* | 3/2018 | Penilla | G10L 15/02 |
| 2018/0260387 A1* | 9/2018 | Ben-Kiki | G06F 40/30 |
| 2019/0362713 A1* | 11/2019 | Asi | G06F 40/20 |
| 2020/0004882 A1* | 1/2020 | Kulkarni | G06F 17/18 |

OTHER PUBLICATIONS

Bouazizi et al. A Pattern-Based Approach for Sarcasm Detection on Twitter. IEEE Access. vol 4. © 2016 IEEE. DOI:10.1109/ACCESS. 2016.2594194. 12 pages. (Year: 2016).*
Ghosh et al. Magnets for Sarcasm: Making Sarcasm Detection Timely, Contextual and Very Personal. Proceedings of the 2017 Conference on Empirical Methods in Natural Language Processing, pp. 482-491. Copenhagen, Denmark, Sep. 7-11, 2017. © 2017 Association for Computational Linguistics. (Year: 2017).*
Joshi et al. Automatic Sarcasm Detection: A Survey. ACM Comput. Surv. 50, 5, Article 73 (Sep. 2017), 22 pages. https://doi.org/10.1145/3124420. (Year: 2017).*
Salas-Zarate et al. Automatic detection of satire in Twitter: A psycholinguistic-based approach. Knowledge-Based Systems 128 (2017) 20-33. http://dx.doi.org/10.1016/j.knosys.2017.04.009. (Year: 2017).*
Rendalkar et al. Sarcasm Detection Of Online Comments Using Emotion Detection. Proceedings of the International Conference on Inventive Research in Computing Applications (ICIRCA 2018) IEEE Xplore Compliant Part No. CFP18N67-ART; ISBN:978-1-5386-2456-2. 7 pages. (Year: 2018).*
Van Hee et al. We Usually Don't Like Going to the Dentist: Using Common Sense to Detect Irony on Twitter. Computational Linguistics. vol. 44, No. 4. © 2018 Association for Computational Linguistics. doi:10.1162/coli_a_00337. 40 pages. (Year: 2018).*
Xiao, Yi. Mixed emotions: unraveling the effects of positive and negative emotions expressed by organizations in crisis on social media. Dissertation submitted to Ghent University. 2018. 154 pages. (Year: 2018).*
P. Mell et al., "The NIST Definition of Cloud Computing", National Institute of Standards and Technology, Information Technology Laboratory, Sep. 2011, pp. 1-7.
A. El Gohary et al., "A Computational Approach for Analyzing and Detecting Emotions in Arabic Text", International Journal of Engineering Research and Applications, vol. 3, Issue 3, May-Jun. 2013, pp. 100-107.
C. Alm et al., "Emotions From Text: Machine Learning for Text-Based Emotion Prediction", Proceedings of the Conference on Human Language Technology and Empirical Methods in Natural Language Processing, Vancouver, BC, CA, Oct. 2005, pp. 579-586 (Abstract Only).
IBM, "Tone Analyzer—API Reference", IBM Watson Developer Cloud, <https://www.ibm.com/watson/developercloud/tone-analyzer/api/v3/curl.html?curl#tone-chat>, Retrieved Jun. 12, 2018, pp. 1-39.
JR Fontaine et al., "The World of Emotions is not Two-Dimensional", PubMed, NCBI, Psychol Sci, Dec. 2007, 18(12):1050-7 (Abstract Only).
B. Pang et al., "Opinion Mining and Sentiment Analysis", Foundations and Trends in Information Retrieval, vol. 2, No. 1-2, 2008, pp. 1-94.
M. Kumar et al., "Emotion Detection Using Lexical Chains", International Journal of Computer Applications, vol. 57, No. 4, Nov. 2012, pp. 1-4.
C. Alm et al., "Emotions From Text: Machine Learning for Text-Based Emotion Prediction", Proceedings of the Conference on Human Language Technology and Empirical Methods in Natural Language Processing, Vancouver, BC, CA, Oct. 2005, pp. 579-586.
Cunningham et al., "Experimental Design From User Studies to Psychophysics", Book Abstract only, Published Oct. 23, 2019, 5 pages.

* cited by examiner

SELECTIVELY ACTIVATING A RESOURCE BY DETECTING EMOTIONS THROUGH CONTEXT ANALYSIS

BACKGROUND

The present invention relates to the field of content analysis, and specifically to detecting emotions through a contextual analysis of content. Still more particularly, the present invention relates to detecting new emotions that are suggested by the contextual analysis of the content.

SUMMARY

In an embodiment of the present invention, a method selectively activates a resource in order to accommodate an advanced emotion. A supervisor computer receives a first piece of content, and then applies an content analyzer to the first piece of content in order to create a first concept/emotion/sentiment/time tuple for the first piece of content. The concept identifies an entity that is referenced in a particular piece of content; the emotion describes an emotion of an author of the particular piece of content; the sentiment describes a sentiment of the author of the particular piece of content; and the time reference identifies a time reference within statements from the particular piece of content (e.g., when the author writes the particular piece of content and/or a reference to a past event/emotion experienced by the author). The supervisor computer receives a second piece of content, and applies the emotion classifier in order to create a second concept/emotion/sentiment/time tuple for the second piece of content, where the second concept/emotion/sentiment/time tuple describes a concept, emotion, sentiment, and time reference for the second piece of content. The supervisor computer compares the first concept/emotion/sentiment/time tuple to the second concept/emotion/sentiment/time tuple, and determines that the concept in the first piece of content matches the concept in the second piece of content and that at least one of the emotion, sentiment, and time reference of the first piece of content does not match the emotion, sentiment, and time reference of the second piece of content. In response to determining that the concept in the first piece of content matches the concept in the second piece of content but that at least one of the emotion, sentiment, and time of the first piece of content does not match the emotion, sentiment, and time reference of the second piece of content, the supervisor computer determines that the emotion of the second piece of content is an advanced emotion that is not expressed by the first piece of content or the second piece of content. The supervisor computer, in response to determining that the emotion of the second piece of content is the advanced emotion, activates a resource, wherein activation of the resource accommodates the advanced emotion.

In an embodiment of the present invention, a method selectively activates a resource in order to accommodate an advanced emotion. One or more processor(s) receive a first piece of a content C1 from an author A1. The processor(s) execute a content analyzer on the content C1 to create a first concept/emotion/sentiment/time tuple T1 for content C1, where the first concept/emotion/sentiment/time tuple T1 describes a concept, emotion, sentiment, and time reference for the content C1, where the concept identifies an entity that is referenced in a particular piece of content, where the emotion describes an emotion of an author of the particular piece of content, where the sentiment describes a sentiment of the author of the particular piece of content, and where the time reference identifies a time reference within statements from the particular piece of content. The processor(s) store tuple T1 in an emotion context store that contains other concept/emotion/sentiment/time tuples for the author A1. The processor(s) receive a second piece of content C2 from author A1, and execute the content analyzer to create a second concept/emotion/sentiment/time tuple T2 for the second piece of content C2. The processor(s) input the second concept/emotion/sentiment/time tuple T2 into an emotion classifier in order to output an advanced emotion E1, where the advanced emotion E1 for content C2 is different from an apparent emotion of the author A1 in the content C2. The processor(s), in response to determining that the advanced emotion E1 for content C2 is different from the apparent emotion of the author A1 in the content C2, activate a resource, where activation of the resource accommodates the different advanced emotion E1 for content C2.

In one or more embodiments, the method(s) described herein are performed by an execution of a computer program product and/or a computer system.

DETAILED DESCRIPTION

Figure 1:
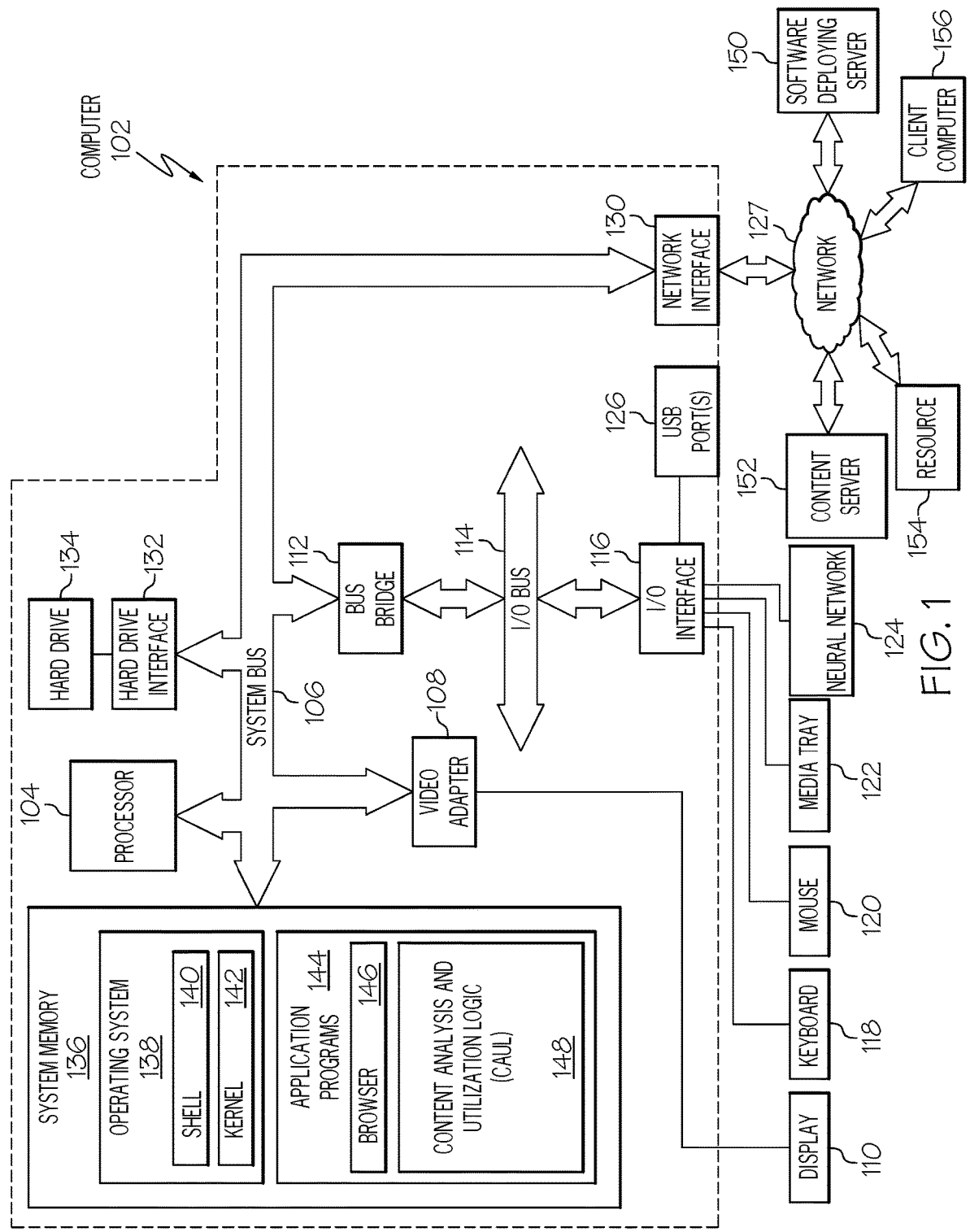
FIG. 1 depicts an exemplary system and network in which the present invention may be implemented.

In one or more embodiments, the present invention is a system, a method, and/or a computer program product at any possible technical detail level of integration. In one or more embodiments, the computer program product includes a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one or more embodiments, computer readable program instructions for carrying out operations of the present invention comprise assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. In one or more embodiments, the computer readable program instructions execute entirely on the user's computer, partly on the user's computer, as a stand-alone software package, partly on the user's computer and partly on a remote computer or entirely on the remote computer or server. In the latter scenario and in one or more embodiments, the remote computer connected to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

In one or more embodiments, these computer readable program instructions are provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one or more embodiments, these computer readable program instructions are also be stored in a computer readable storage medium that, in one or more embodiments, direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one or more embodiments, the computer readable program instructions are also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams represents a module, segment, or portion of instructions, which comprises one or more executable instructions for implementing the specified logical function(s). In some alternative implementations, the functions noted in the block occur out of the order noted in the figures. For example, two blocks shown in succession are, in fact, executed substantially concurrently, or the blocks are sometimes executed in the reverse order, depending upon the functionality involved. It will also be noted that, in one or more embodiments of the present invention, each block of the block diagrams and/or flowchart illustration, and combinations of blocks in the block diagrams and/or flowchart illustration, are implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or content server 152 and/or resource 154 and/or client computer 156.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a neural network 124 (described in greater detail in an exemplary embodiment depicted in FIG. 3), and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, a content server 152, a resource 154, and/or a client computer 156 using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a Content Analysis and Utilization Logic (CAUL) 148. CAUL 148 includes code for implementing the processes described below, including those described in FIGS. 2-7. In one embodiment, computer 102 is able to download CAUL 148 from software deploying server 150, including in an on-demand basis, wherein the code in CAUL 148 is not downloaded until needed for execution. Note further that, in one embodiment of the present invention, software deploying server 150 performs all of the functions associated with the present invention (including execution of CAUL 148), thus freeing computer 102 from having to use its own internal computing resources to execute CAUL 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Emotion detection aims to detect and recognize types of feelings such as anger, disgust, fear, happiness, sadness, and surprise. Emotion detection can be based on video (facial expressions), audio (tone of speech in a phone call), or text information (call center notes, customer emails, social media posts and comments). In one or more embodiments of the present invention, emotion detection is focused towards a certain topic. That is, the emotion detection captures emotions towards a particular product or service, a company, etc. Note that emotion detection is different from sentiment analysis, which aims to detect positive, neutral, or negative expressions. That is, emotion detection detects emotions such as joy, sadness, anger, etc., particularly when discussing a certain topic, incident, entity, etc. Sentiment analysis, however, is directed to detecting whether a person agrees with (positive) a certain position, disagrees with (negative) a certain position, or is indifferent to (neutral) a certain position. For example, a person may be anxious (an emotion) when hearing that a person is taking a certain course of economic action, even though the person agrees with (sentiment) that certain course of action being taken.

A tone analyzer application program interface (API) is able to recognize certain emotions and/or sentiments by looking at certain terms within a document. For example, a tone analyzer API is able to determine that an author of an email is angry based on the presence of terms such as "angry" or "mad" within the email. However, a tone analyzer API is unable to recognize irony, sarcasm, etc., in which words are used in an ironic way. For example, if a text message read "I am so sad that the rival team lost", the tone analyzer API would interpret this to mean that the author is genuinely sad that the rival team lost, when in fact the author was being sarcastic, and is delighted that the rival team lost.

Thus, one or more embodiments of the present invention determine, based on past content and their context, what the true ("new") emotion of the author is in a current content, in order to determine the true emotion of the author(s) of the current content.

As such, one or more embodiments of the present invention provide an improvement over the prior art by being able to detect new emotions, such as "Schadenfreude". As described in one or more embodiments herein, the present invention creates an emotion classifier that combines emotion detection approaches with a novel emotion context. This novel emotion context captures a chronology of statements from a group of authors. This is done through detection of time references within statements; tracking the time the statement was made (e.g., when it was posted on social media); tracking the sentiment of each statement; and tracking the topic of each statement.

This novel emotion context allows the invention to classify new statements/content from a particular author with new emotions, which are not possible to detect with prior art emotion detection approaches.

In an embodiment of the present invention, the emotion classifier (of the new statements/content) is based on manually created rules.

In another embodiment of the present invention, the emotion classifier (of the new statements/content) is developed by training a machine learning algorithm. Thus, in this embodiment, the present invention creates and structures the emotion context in a way such that machine-learning approaches like neural networks can "learn" the relevance of the chronological order of an author's posts.

As such, the present invention works regardless of the approach being used to detect time references, sentiment or existing emotions.

Examples of new emotions that the present invention can detect include, but are not limited to, Schadenfreude, irony, hope, and nostalgia.

Schadenfreude (gloating, malicious joy) is an emotion that is expressed by a combination of positive sentiment, or a positive emotion (such as happiness) in the present, combined with a reference to a past negative sentiment or emotion, such as "I was devastated when Rival Football Team defeated my favorite team last year. Today Rival Football Team lost. This makes my day!"

Irony is a positive sentiment for a topic that is seen as overwhelmingly negative by many other authors at the same time, such as a text message saying, "Good job, Rival Football Team," on the day that Rival Football Team loses a major game.

Hope is a positive emotion about the future, such as that found in the sentence "I believe next year things will improve."

Nostalgia is a sad feeling in the here and now about something positive in the past, such as that found in the text: "Everything is too complicated. In my childhood, we had only one design and one flavor of Beverage X, and I was absolutely happy".

Figure 2:
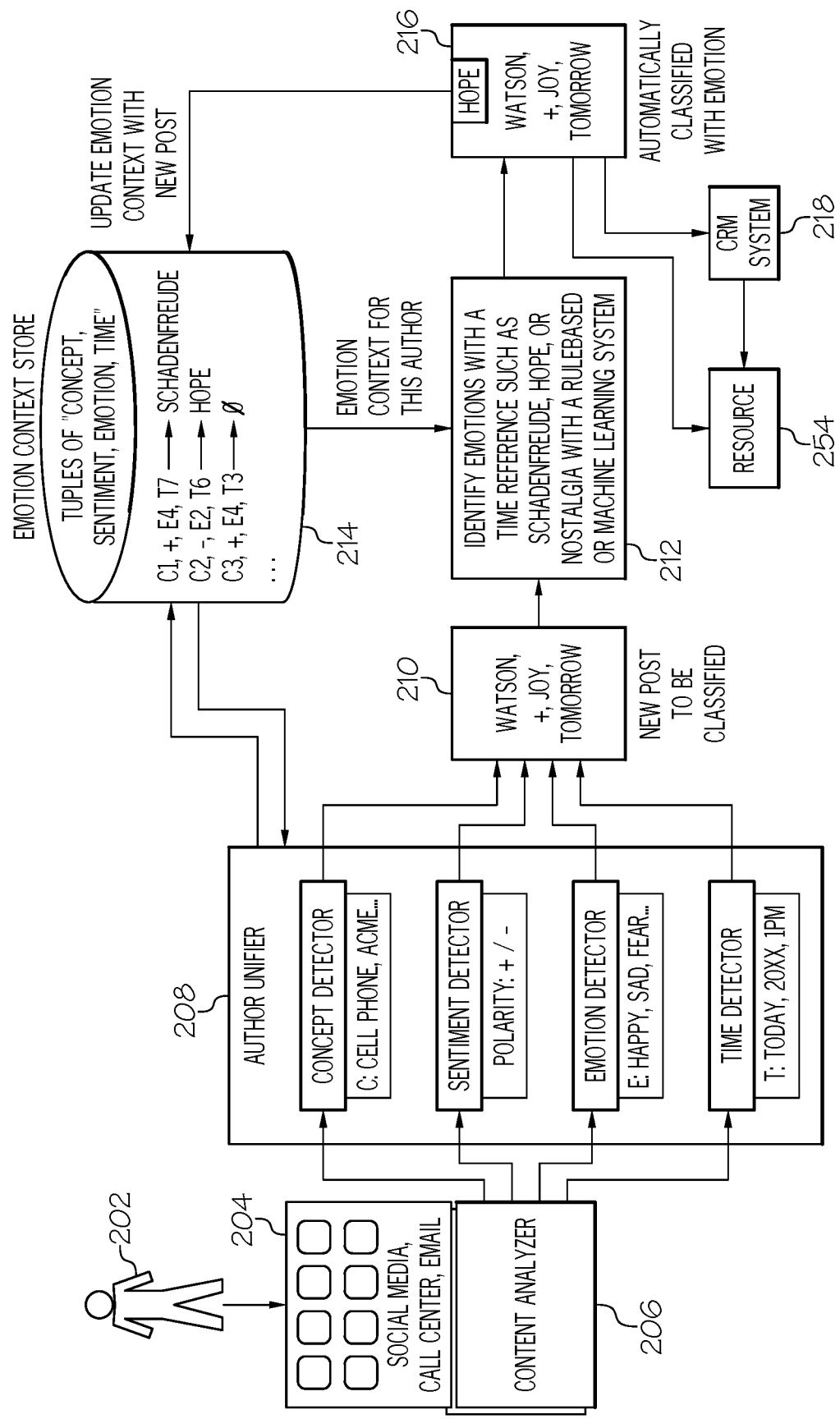
FIG. 2 depicts an overview of one or more embodiments of the present invention.

With reference now to FIG. 2, an overview of one or more embodiments of the present invention is presented. Assume that an author 202 generates content (e.g., text, a self-photo, a meme, etc.) to a social media platform 204 or other system, such as an email, a problem ticketing system, etc. A content analyzer 206 then analyzes the posted content in order to identify the posted content's static concept (e.g., an entity described in the posted content); the sentiment of the posted content (e.g., whether the author is for, against, or indifferent to what the posted content is describing); the emotion of the author regarding the posted content (e.g., sad, angry, happy, etc.); and the time (e.g., timestamp) that the particular posted content was authored and/or posted/published/distributed.

The results of the content analyzer 206 are sent to an analysis buffer 208, which includes an "author unifier" that has a record of various pseudonyms used by the author of the posted content, thus providing additional information for identifying the actual emotion(s) of the current author.

The new posted content (block 210) is sent to a system, such as computer 102 shown in FIG. 1, which identifies the actual emotion of the new posted context (block 212) according to other tuples found in database 214, which have previously identified tuples that reflect incongruous emotions such as Schadenfreude, hope, irony, nostalgia, etc. This allows the system to automatically classify the new emotion found in the newly posted content (block 216), which then updates the database 214.

Once the true (new) emotion of the posted content is determined, it is sent to a customer relations management (CRM) system, which provides an appropriate response to the author's posted content. In one or more embodiments of the present invention, the CRM system 218 (or alternatively, a management computer such as supervisor computer 402 shown in FIG. 4) adjusts a resource 254 that is responsive to the posted content, such as that described in FIG. 4 and FIG. 5.

In an embodiment of the present invention a CRM system is not used. Rather, any type of system (e.g., customer feedback system, etc.) is used. Furthermore, in an embodiment of the present invention, there is no direct response to a comment, posting, etc.

Example 1: Detecting Schadenfreude by Tracking an Emotion Context Across Statements Assume that on March 28, 20XX, User X posts "Rival Football Team won today because of a BAD CALL by the referee; I am devastated!" in a social media outlet platform. As described above, this March 28, 20XX posting is analyzed by a content analyzer API (e.g., content analyzer 206), which detects the concept "Rival Football Team"; the negative sentiment (that the author does not agree that Rival Football Team should have won, since they benefited from a bad call); an angry sentiment (based on the use of all caps when describing the bad call and the use of an exclamation point after the word "devastated"); and the time detector of March 28, 20XX based on "today".

The system then stores this content analysis result as an entry for User X. In various embodiments, the storage of the content analysis result is in a database (e.g., database 214 shown in FIG. 2), a flat file (i.e., an unstructured database file), etc. The entry not only captures the extraction results themselves (Rival Football Team, negative sentiment, angry, March 28, 20XX), but also the position where key words (e.g., "Rival Football Team", "BAD CALL", "devastated") occurred within the text.

Assume now that on November 1, 20XX, User X posts: "Rival Football Team lost in overtime, and they deserved it. This makes my day".

The detectors in the content analyzer extract "Rival Football Team" (concept); a positive sentiment ("they deserved it"); a happy emotion (makes my day); and a time stamp of November 1, 20XX from the November 1, 20XX post. The present invention then creates a new emotion entry for User X. That is, the present invention compares the context entries (tuples) for User X and determines that the second post expresses Schadenfreude towards Rival Football Team. This new emotion determination is rule based in one embodiment of the present invention, and is machine learned in another embodiment of the present invention.

For example, consider the embodiment in which the identification of Schadenfreude is rule based. In an exemplary implementation of this embodiment, a manually crafted rule states <strong negative emotion towards concept X on time T1>+<positive emotion in the context of concept X on time T2>→<Schadenfreude towards X>. For example, the rule may state that if initially (on time T1) something good happened to an entity (concept X), which makes the author angry (<strong negative emotion towards concept X on time T1>), and later (on time T2) something bad happens to the entity (concept X), which makes the author happy (<positive emotion in the context of concept X on time T2>), then the author is feeling Schadenfreude towards the entity.

Consider now an embodiment of the present invention that is machine learning-based. In one embodiment, in a training step combinations of these emotion context entries are combined with the appropriate label (e.g., Schadenfreude). A machine learning system such as a neural network learns which features from the author context contribute to the label, and uses this to classify new entries. In one or more embodiments, the neural network also implicitly learns how close together in the text these features need to occur to yield a valid classification.

As an optional addition, one embodiment of the present invention uses an external "author unifier" that captures the fact that User X on a first social media website (on which the earlier content was posted) is the same person as User X' on a second social media website (on which the later content was posted). Thus, the emotion context entries that were derived from either source can be combined for the next classification.

Example 2: Detecting Schadenfreude by Tracking an Emotion Context within a Statement In November 1, 20XX, User X posts: "I was devastated when Rival Football Team won 8 months ago, which was wrong. Today's justified loss by Rival Football Team makes my day!"

As in Example 1 above, the content analyzer API determines a single concept (Rival Football Team); thus, two sentiments ("wrong" for the earlier win and "justified" for the current loss); two emotions ("devastated" for the earlier win and "makes my day" for the current loss); and two time references ("today"—November 1, 20XX, and "8 months ago"—e.g., March 20XX) are detected by the current invention.

Thus, even though there is only one posting, the present invention creates two entries in the emotion context for User X. In one embodiment of the present invention, it simply uses the position of the time references in the text to split up the statement into two entries, based on manual rules such as "If sentence S contains a time reference T, everything in S, and all sentences to the right of S belong to T—until a new time reference T1 is detected." In another embodiment, the present invention uses a machine learning approach such as a neural network to learn which sequences within a statement constitute an entry in the emotion context.

In one or more embodiments of the present invention, any time reference (e.g., time reference T) is for the past, present, and/or future. For example, the time reference is for when the author felt a particular emotion, such as when the author wrote the piece of content and/or later. Thus, the present invention is also useful when the author writes: "four weeks ago, my team lost; I was devastated." The content analysis process described herein will thus extract "four weeks ago" as the time reference, and stores that as the "time" of the concept/sentiment/basic emotion/time tuple.

Example 3: Detecting Irony by Tracking the Emotion Context for a Larger Group of Authors On October 9, 20XX, numerous sports fans post social media messages such as "Rival Football Team DID NOT DESERVE to win today". These postings are collected using key word detectors, etc. In this embodiment, the concept (Rival Football Team), negative sentiment (does not deserve to win), emotion (anger, as demonstrated by the ALL CAPS), and date stamp (October 9, 20XX) from the numerous social media messages are stored as a collective unit. As a result, the emotion context contains numerous posting about Rival Football Team that are negative and angry. On October 10, 20XX, Fan X posts the social media message "Great job, Rival Football Team!" Assume that Fan X had not posted anything about Rival Football Team before, particularly with regard to the win by Rival Football Team on October 9, 20XX. As such, there is no topic-specific emotion context for Fan X.

However, this embodiment of the present invention creates a global current emotion context by pulling out all (or a significant sample of) entries about "Rival Football Team" that were made within a certain time frame (e.g., the last 24 hours). Based on this emotion context (which is overwhelmingly negative), the present invention classifies Fan X's statement as Irony. As in the other examples, this classification can be done based on manually-crafted rules, or as the result of training a machine learning classifier.

In one or more embodiments of the present invention, a neural network (NN) is utilized to identify the new (incongruous) emotion. As the name implies, an NN is roughly modeled after a biological neural network (e.g., a human brain). A biological neural network is made up of a series of interconnected neurons, which affect one another. For example, a first neuron can be electrically connected by a synapse to a second neuron through the release of neurotransmitters (from the first neuron) which are received by the second neuron. These neurotransmitters can cause the second neuron to become excited or inhibited. A pattern of excited/inhibited interconnected neurons eventually lead to a biological result, including thoughts, muscle movement, memory retrieval, etc. While this description of a biological neural network is highly simplified, the high-level overview is that one or more biological neurons affect the operation of one or more other bio-electrically connected biological neurons.

An electronic neural network similarly is made up of electronic neurons. However, unlike biological neurons, electronic neurons are never technically "inhibitory", but are only "excitatory" to varying degrees.

Figure 3:
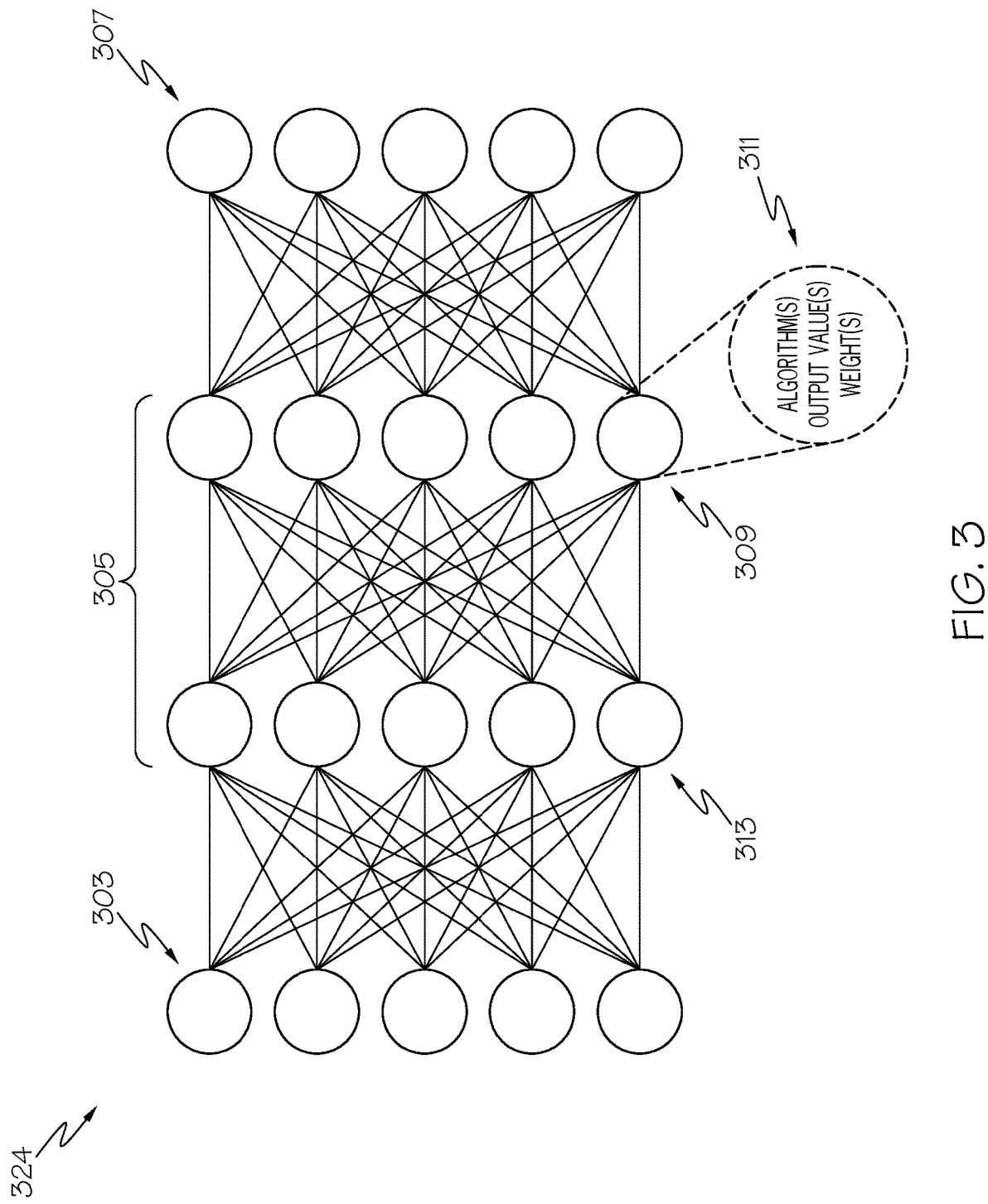
FIG. 3 illustrates an exemplary Neural Network (NN) as used in one or more embodiments of the present invention.

With reference now to FIG. 3, an exemplary neural network (NN) 324 (analogous to NN 124 shown in FIG. 1) is displayed. In an NN, neurons are arranged in layers, known as an input layer 303, hidden layers 305, and an output layer 307. The input layer 303 includes neurons/nodes that take input data, and send it to a series of hidden layers of neurons (e.g., hidden layers 305), in which all neurons from one layer in the hidden layers are interconnected with all neurons in a next layer in the hidden layers 305. The final layer in the hidden layers 305 then outputs a computational result to the output layer 307, which is often a single node for holding vector information.

As just mentioned, each node in the depicted NN 324 represents an electronic neuron, such as the depicted neuron 309. As shown in block 311, each neuron (including neuron 309) functionally includes at least three features: an algorithm, an output value, and a weight.

The algorithm is a mathematic formula for processing data from one or more upstream neurons. For example, assume that one or more of the neurons depicted in the middle hidden layers 305 send data values to neuron 309. Neuron 309 then processes these data values by executing the algorithm shown in block 311, in order to create one or more output values, which are then sent to another neuron, such as another neuron within the hidden layers 305 or a neuron in the output layer 307. Each neuron also has a weight that is specific for that neuron and/or for other connected neurons.

For example, assume that neuron 313 is sending the results of its analysis of a piece of data to neuron 309. Neuron 309 has a first weight that defines how important data coming specifically from neuron 313 is. If the data is important, then data coming from neuron 313 is weighted heavily, thus causing the algorithm(s) within neuron 309 to generate a higher output, which will have a heavier impact on neurons in the output layer 307. Similarly, if neuron 313 has been determined to be significant to the operations of neuron 309, then the weight in neuron 313 will be increased, such that neuron 309 receives a higher value for the output of the algorithm in the neuron 313. These weights are adjustable for one, more, or all of the neurons in the NN 324, such that a reliable output will result from output layer 307. Such adjustments may be performed manually or automatically.

When manually adjusted, the weights are adjusted by the user, sensor logic, etc. in a repeated manner until the output from output layer 307 matches expectations. For example, assume that input layer 303 receives context values from a posted document (see FIG. 2). If the output from output layer 307 is a vector that is predetermined to describe a certain emotion (e.g., irony), then the weights (and alternatively the algorithms) are adjusted until the vector generated by output layer 307 has a value that is associated with the emotion irony.

When automatically adjusted, the weights (and/or algorithms) are adjusted using "back propagation", in which weight values of the neurons are adjusted by using a "gradient descent" method that determines which direction each weight value should be adjusted to. This gradient descent process moves the weight in each neuron in a certain direction until the output from output layer 307 improves (e.g., gets closer to representing a certain emotion such as irony).

Figure 4:
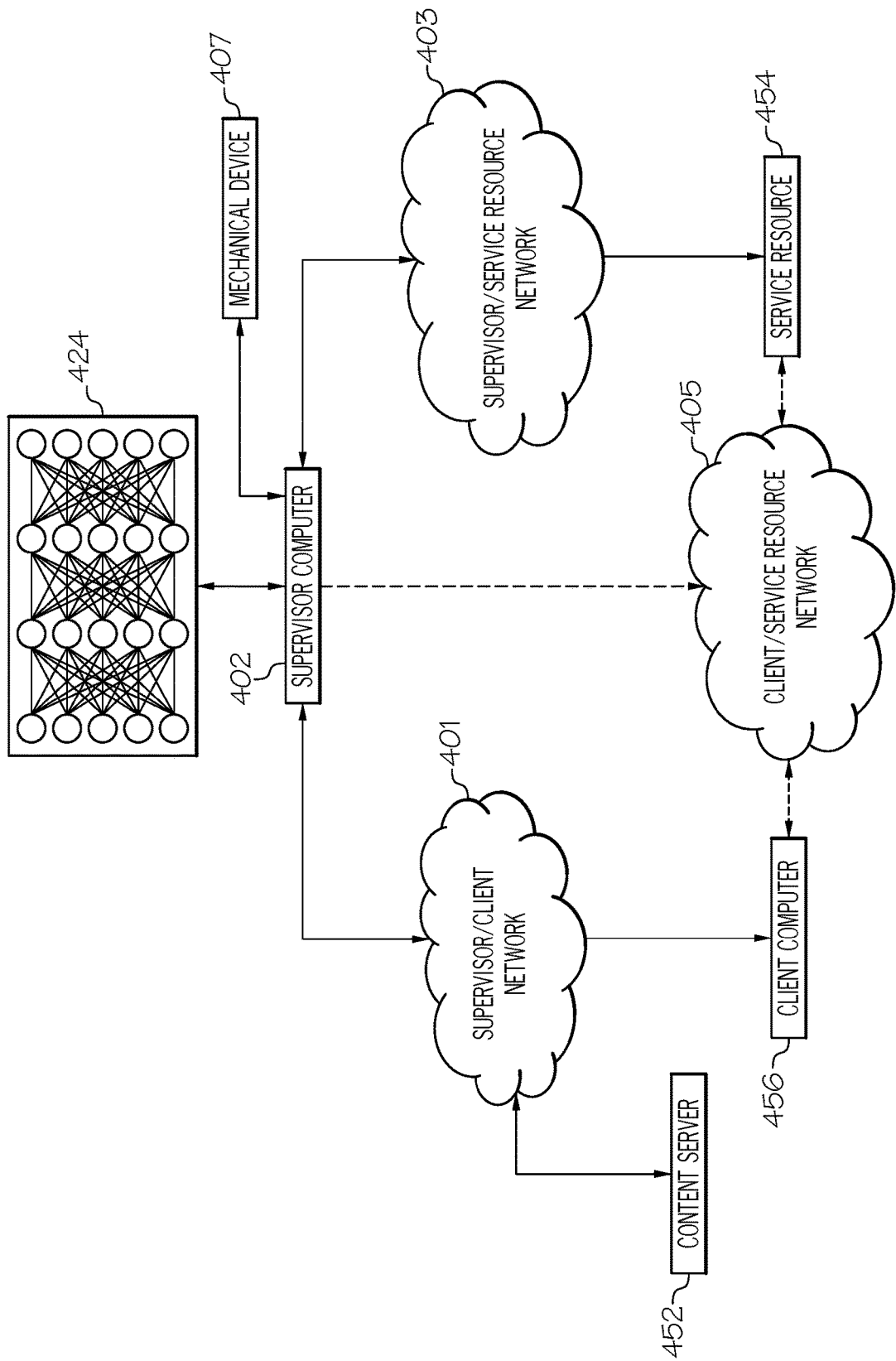
FIG. 4 depicts an overview of an architecture utilized in one or more embodiments of the present invention.

With reference now to FIG. 4, an overview of an architecture utilized in one or more embodiments of the present invention is presented.

As shown in FIG. 4, a supervisor computer 402 (analogous to computer 102 shown in FIG. 1) is coupled to a content server 452 (analogous to content server 152 shown in FIG. 1) and a client computer 456 (analogous to client computer 156 shown in FIG. 1) via a first supervisor/client network 401, which is neither directly connected to a supervisory/service resource network 403 (which connects the supervisor computer 402 to a service resource 454 (analogous to service resource 154 shown in FIG. 1)) nor a client/service resource network 405.

Supervisor computer 402 receives content from content server 452 (e.g., from multiple posters of content onto a social media website) and/or from client computer 456 (e.g., an individual poster of content, such as "User X" described above). Supervisor computer 402 generates the tuples described above for content (e.g., tuples that describe a concept, a sentiment, an emotion, and a time/date associated with the content) either using the content analyzer 206 shown in FIG. 2 or the NN 424 (analogous to NN 324 shown in FIG. 3). When using the NN 424, the NN 424 is trained to take terms from content in order to identify the initial tuples.

Furthermore, in one or more embodiments of the present invention, the NN 424 is trained to take subsequent tuples (e.g., a first tuple that describe a concept, a sentiment, an emotion, and a time/date associated with a first content and a second tuple that describe a concept, a sentiment, an emotion, and a time/date associated with a second content that is created after the first content). The NN 424 has been trained (e.g., by adjusting weights, algorithms, connections, etc. between neurons) to recognize a new emotion in the second content that is not described in the second tuple. That is, as described herein, the NN 424 is trained to detect emotions such as irony, Schadenfreude, etc. that are not detectable just by the second content, but instead rely on a comparison of two temporally-separated contents (the first content and the second content).

Once the supervisor computer 402 detects this new emotion, it activates a resource that will accommodate the author of the second content.

In an embodiment, the present invention activates a mechanical device that accommodates the new emotion. For example, assume that the supervisor computer detects the content "Wow, pump #32 is working GREAT today!". Prior art would assume that the author of this content is in fact very happy with how pump #32 is working at pumping out water from a flood zone. However, the present invention will detect, based on other postings about pump #32 that it in fact is either not working at all, or else is unable to keep up with all of the water that is flowing into the flood zone. As such, supervisor computer 402 will bring pump #32 and/or other pumps (examples of mechanical device 407) online (i.e., will activate/turn on pump #32 and/or other pumps), since supervisor computer 402 has detected that the irony in the tone of the new posting is saying that pump #32 is actually not performing up to the needs of the situation.

In an embodiment of the present invention, the supervisor computer 402 activates a client/service resource network 405 that allows the client computer 456 to communicate with the service resource 454 when a certain non-obvious emotion is detected in a second content from a user of the client computer 456. For example, assume that the user of client computer 456 sends an email to supervisor computer 402 saying "I am sure that my computer could be fast". Based on other contents by this user or others, the present invention determines that the emotion in this text is hope, rather than certainty (I am sure), since the user is actually hoping that something could be done to make his/her client computer 456 faster at computing, sending/receiving data, etc. The supervisor computer 402 recognizes this emotion of hope, and then activates the previously turned off client/service resource network 405, which allows the service resource 454 to send a software patch to the client computer 456 (making the client computer 456 faster), allows the client computer 456 to offload some routine processing operations to service resource 454 (which is a computer in one or more embodiments of the present invention), etc. That is, only by selectively activating the client/service resource network 405 can the client computer 456 now receive the services and/or software needed to improve the operations of client computer 456, and client/service resource network 405 is only activated in response to supervisor computer 402 detecting a non-obvious emotion in a second content posted by the user of the client computer 456.

Figure 5:
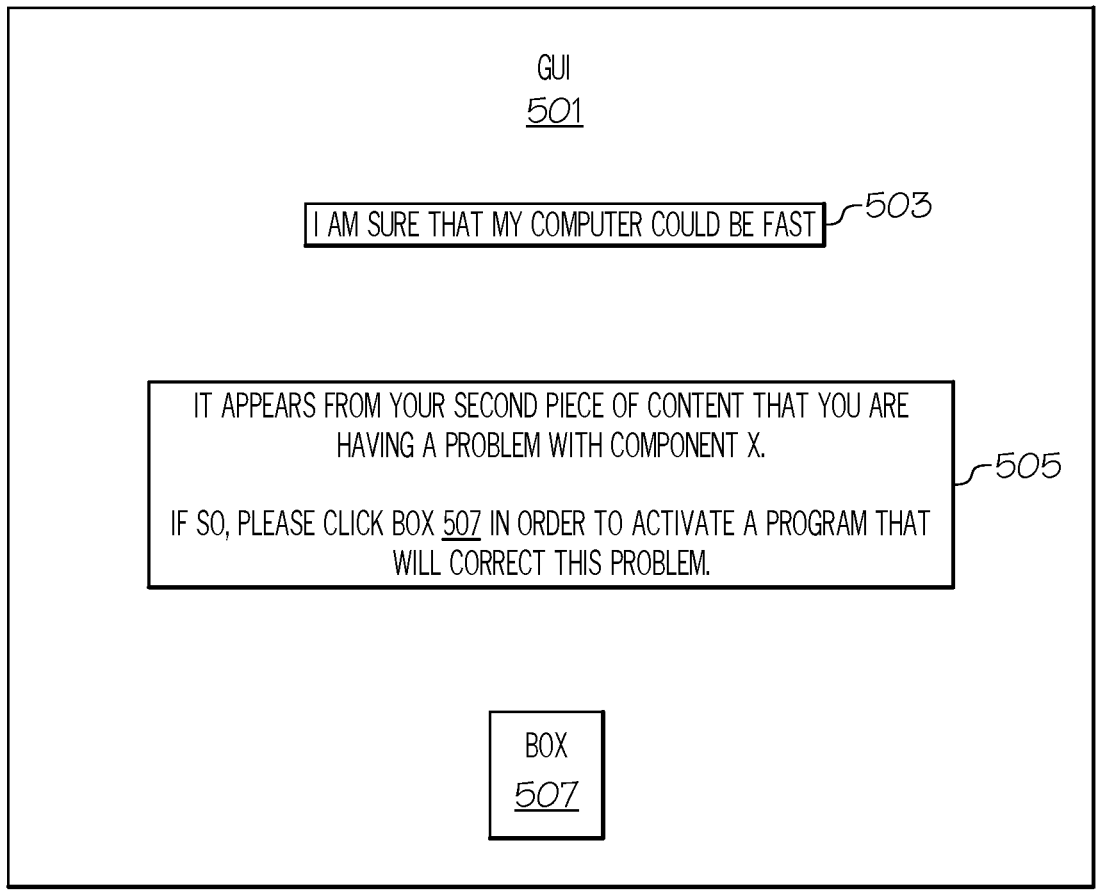
FIG. 5 illustrates an exemplary graphical user interface (GUI) as used in one or more embodiments of the present invention.

Thus, as shown in FIG. 5, an exemplary graphical user interface (GUI) 501 is shown on a display on the client computer 456 shown in FIG. 4. As shown in block 503, the user has typed in the message "I am sure that my computer could be fast," to the supervisor computer 402. The supervisor computer 402 then responds with a message shown in block 505, advising the user of the GUI 501 to click box 507 in order to correct the perceived problem. This results in the client/service resource network 405 being activated, and service resource 454 being directed to send a software patch to the client computer 456. In another embodiment, the client computer 456 receives the software patch directly from the supervisor computer 402 via the supervisor/client network 401.

Figure 6:
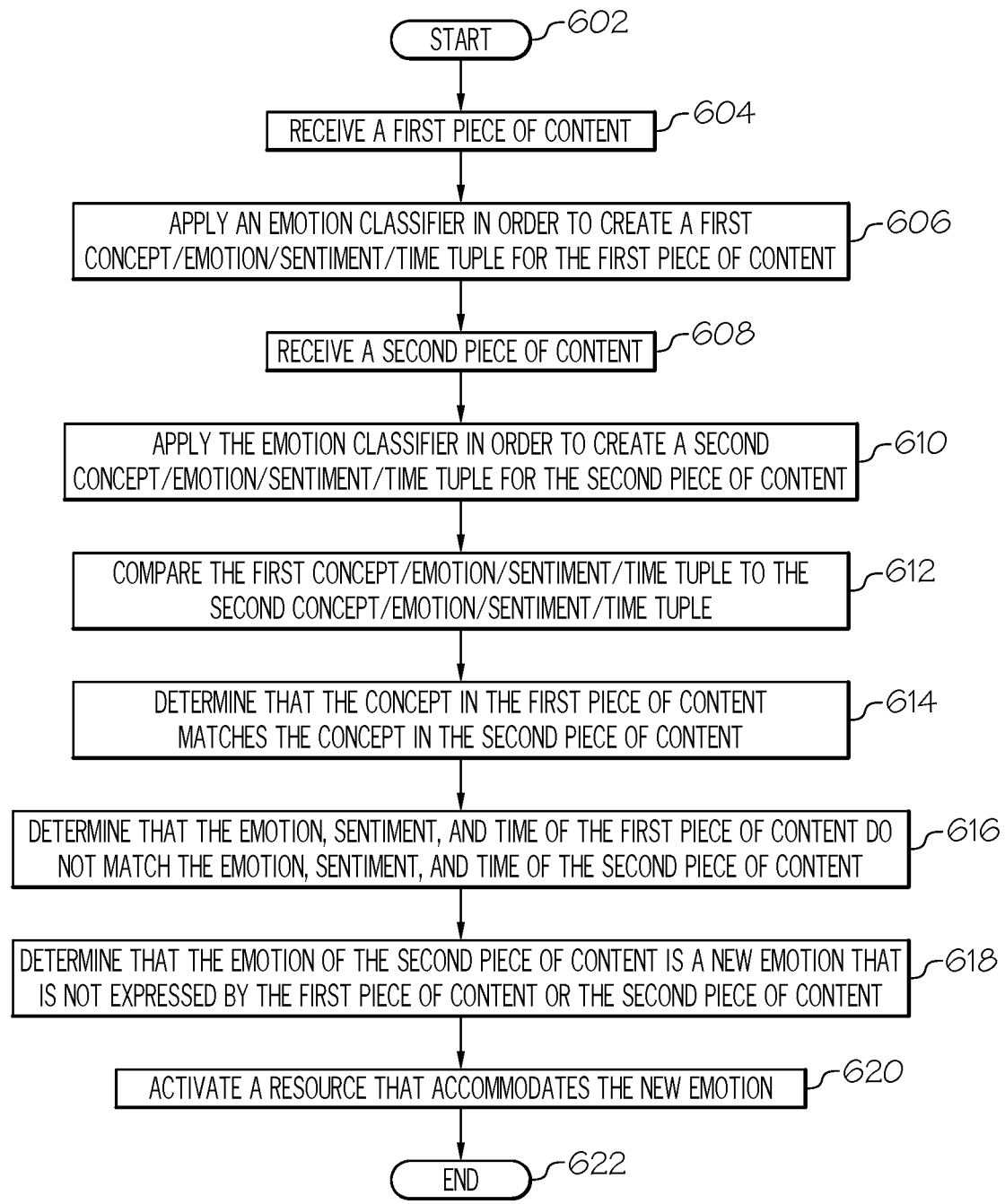
FIG. 6 is a high-level flow chart of one or more steps performed in accordance with one or more embodiments of the present invention.

With reference now to FIG. 6, a high-level flow chart of one or more steps performed in accordance with one or more embodiments of the present invention is presented.

After initiator block 602, a supervisor computer (e.g., supervisor computer 402 shown in FIG. 4) receives a first piece of content (e.g., a first social media posting), as described in block 604.

As described in block 606, the supervisor computer applies an emotion classifier (e.g., part of the content analyzer 206 shown in FIG. 2) in order to create a first concept/emotion/sentiment/time tuple for the first piece of content. As described herein, the first concept/emotion/sentiment/time tuple describes a concept, emotion, sentiment, and time for the first piece of content; where the concept identifies an entity that is referenced in a particular piece of content; where the emotion describes an emotion of an author of the particular piece of content; where the sentiment describes a sentiment of the author of the particular piece of content; and where the time identifies when the author wrote the particular piece of content.

As described in block 608, the supervisor computer then receives a second piece of content that was created after the first piece of content.

As described in block 610, the supervisor computer then applies the emotion classifier in order to create a second concept/emotion/sentiment/time tuple for the second piece of content, where the second concept/emotion/sentiment/time tuple describes a concept, emotion, sentiment, and time for the second piece of content.

As described in block 612, the supervisor computer compares the first concept/emotion/sentiment/time tuple to the second concept/emotion/sentiment/time tuple.

As described in block 614, the supervisor computer determines that the concept in the first piece of content matches the concept in the second piece of content. For example, by comparing the first concept/emotion/sentiment/time tuple to the second concept/emotion/sentiment/time tuple, the supervisor computer determines that both the first piece of content and the second piece of content include a reference to "Rival Football Team" (the concept of the contents).

As described in block 616, the supervisor computer determines that the emotion, sentiment, and time of the first piece of content do not match the emotion, sentiment, and time of the second piece of content. That is, the emotion, sentiment, and time found in the first concept/emotion/sentiment/time tuple does not match the emotion, sentiment, and time found in the second concept/emotion/sentiment/time tuple.

As described in block 618, in response to determining that the concept in the first piece of content matches the concept in the second piece of content but that the emotion, sentiment, and time of the first piece of content do not match the emotion, sentiment, and time of the second piece of content, the supervisor computer determines that the emotion of the second piece of content is a new emotion (e.g., Schadenfreude, irony, hope, etc.) that is not expressed by the first piece of content or the second piece of content.

As described in block 620, in response to determining that the emotion of the second piece of content is the new emotion, the supervisor computer activates a resource, where activation of the resource accommodates the new emotion. (See FIG. 4.)

The flow chart ends at terminator block 622.

In an embodiment of the present invention, the supervisor computer inputs the first concept/emotion/sentiment/time tuple and the second concept/emotion/sentiment/time tuple into a neural network in order to determine the new emotion. (See FIG. 3).

In an embodiment of the present invention, the emotion classifier is based on manually created rules. For example, a rule may state that "if initially (on time T1) something good happened to an entity (concept X), which makes the author angry (<strong negative emotion towards concept X on time T1>), and later (on time T2) something bad happens to the entity (concept X), which makes the author happy (<positive emotion in the context of concept X on time T2>), then the author is feeling Schadenfreude towards the entity.

In an embodiment of the present invention, the supervisor computer matches the second piece of content to a new author, where the resource being activated is a communication network that has been architected to provide a communication with the new author of the second piece of content whose emotion is the new emotion. (See FIG. 4.)

In an embodiment of the present invention, the supervisor computer matches the second piece of content to a new author, and the resource being activated is a mechanical device that has been designed to perform a physical action that ameliorates the new emotion in the new author. (See element 407 in FIG. 4.)

In an embodiment of the present invention, the supervisor computer matches the second piece of content to a new author, and the resource being activated is a software application that has been designed perform an action on a client computer used by the new author that ameliorates the new emotion in the new author (See FIG. 5.)

In an embodiment of the present invention, the supervisor computer presents a link (e.g., box 507 in FIG. 5) to the software application to the client computer. The supervisor computer then receives an activation signal from the client computer of the link from the new author in order to transmit and activate the software application in the client computer.

In an embodiment of the present invention, the sentiment describes whether the author is in favor of the particular piece of the content, is opposed to the piece of content, or is neutral to the particular piece of content.

In an embodiment of the present invention, the first piece of content and the second piece of content are both textual contents (e.g., written posts).

In an embodiment of the present invention, the first piece of content is textual content and the second piece of content is video content. For example, assume that the first piece of content is a written post by Fan X stating that he is angry that Rival Football Team won due to a bad call by the referee. Assume further that the second piece of content, posted after the first piece of content, is a video of Fan X showing glee while watching Rival Football Team losing a game. The system thus determines that Fan X is showing Schadenfreude according to the process described herein.

In an embodiment of the present invention, the first piece of content and the second piece of content are both authored by a same author. Thus, the different tuples for different content produced by a same author are used to detect irony, hope, etc.

In an embodiment of the present invention, the first piece of content is authored by a first set of multiple authors, and the second piece of content is authored by a new author that is not part of the first set of multiple authors. For example, if numerous persons initially post "Rival Football Team LOSES! That is great!" Thereafter, if a different author posts "So sad for Rival Football Team", then the system will determine that this later post ("So sad for Rival Football Team") is intended to be sardonic/ironic.

In an embodiment of the present invention, an output of the presently described system is used in elaborate decision management systems, and results in the author being sent an information communication (e.g., email) weeks/months after the author wrote the first content.

In an embodiment of the present invention, an output of the presently described system is used in a machine learning system that tries to identify general attitudes of a larger cohort of people, without reaching back to an individual author.

Figure 7:
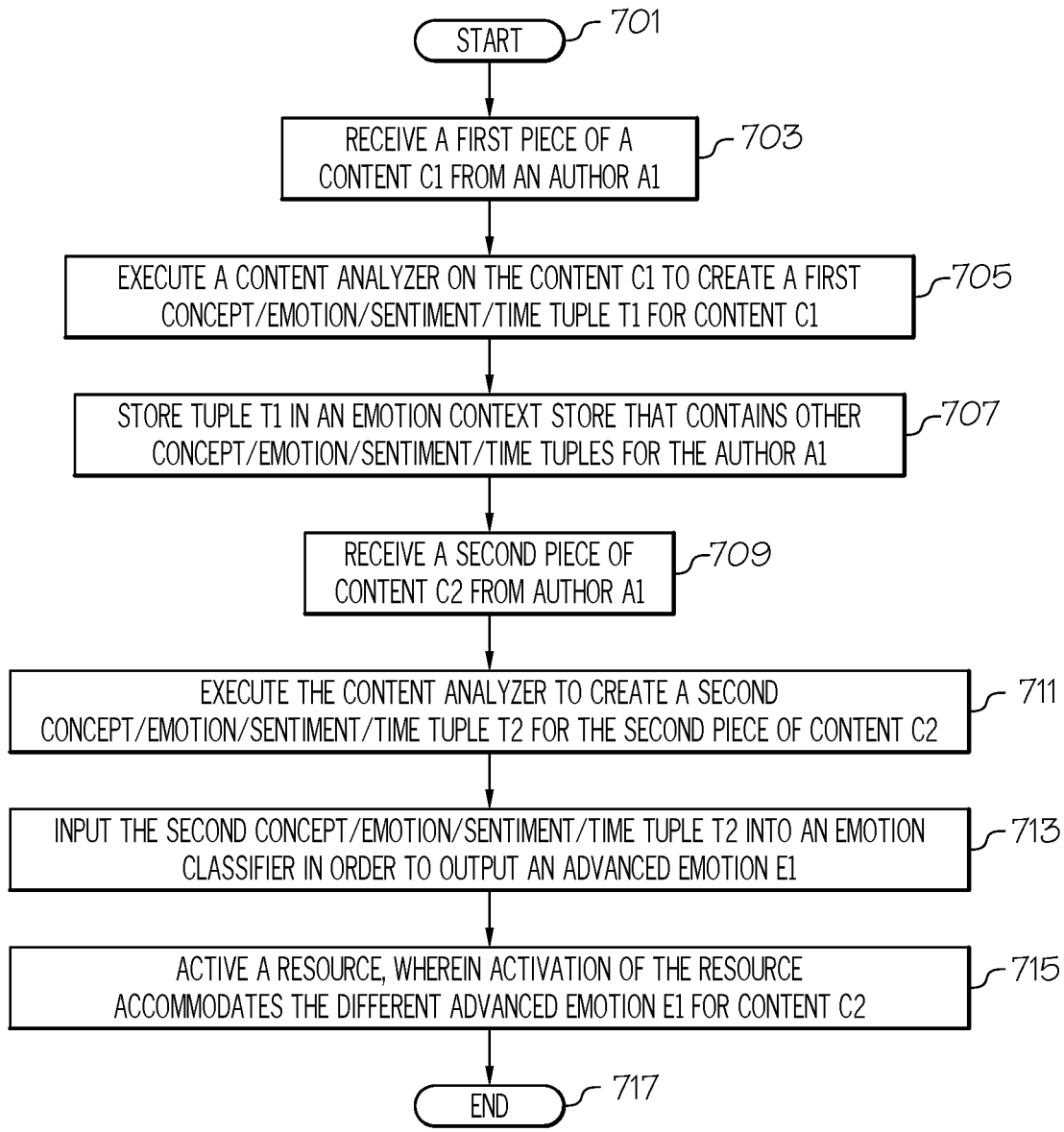
FIG. 7 is an alternative high-level flow chart of one or more steps performed in accordance with one or more embodiments of the present invention.

With reference now to FIG. 7, a high-level flow chart describing an alternate description of one or more embodiments of the present invention is presented.

After initiator block 701, one or more processors (e.g., processor 104 shown in FIG. 1) receives a first piece of a content C1 from an author A1, as described in block 703.

As described in block 705, the processor(s) execute a content analyzer on the content C1 to create a first concept/emotion/sentiment/time tuple T1 for content C1, where the first concept/emotion/sentiment/time tuple T1 describes a concept, emotion, sentiment, and time reference for the content C1, where the concept identifies an entity that is referenced in a particular piece of content, where the emotion describes an emotion of an author of the particular piece of content, where the sentiment describes a sentiment of the author of the particular piece of content, and where the time reference identifies when the author writes the particular piece of content.

As described in block 707, the processor(s) store tuple T1 in an emotion context store that contains other concept/emotion/sentiment/time tuples for the author A1.

As described in block 709, the processor(s) receive a second piece of content C2 from author A1.

As described in block 711, the processor(s) execute the content analyzer to create a second concept/emotion/sentiment/time tuple T2 for the second piece of content C2;

As described in block 713, the processor(s) input the second concept/emotion/sentiment/time tuple T2 into an emotion classifier in order to output an advanced emotion E1, where the advanced emotion E1 for content C2 is different from an apparent emotion of the author A1 in the content C2.

As described in block 715, the processor(s), in response to determining that the advanced emotion E1 for content C2 is different from the apparent emotion of the author A1 in the content C2, activate a resource, where activation of the resource accommodates the different advanced emotion E1 for content C2.

In one or more embodiments, the present invention is implemented using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
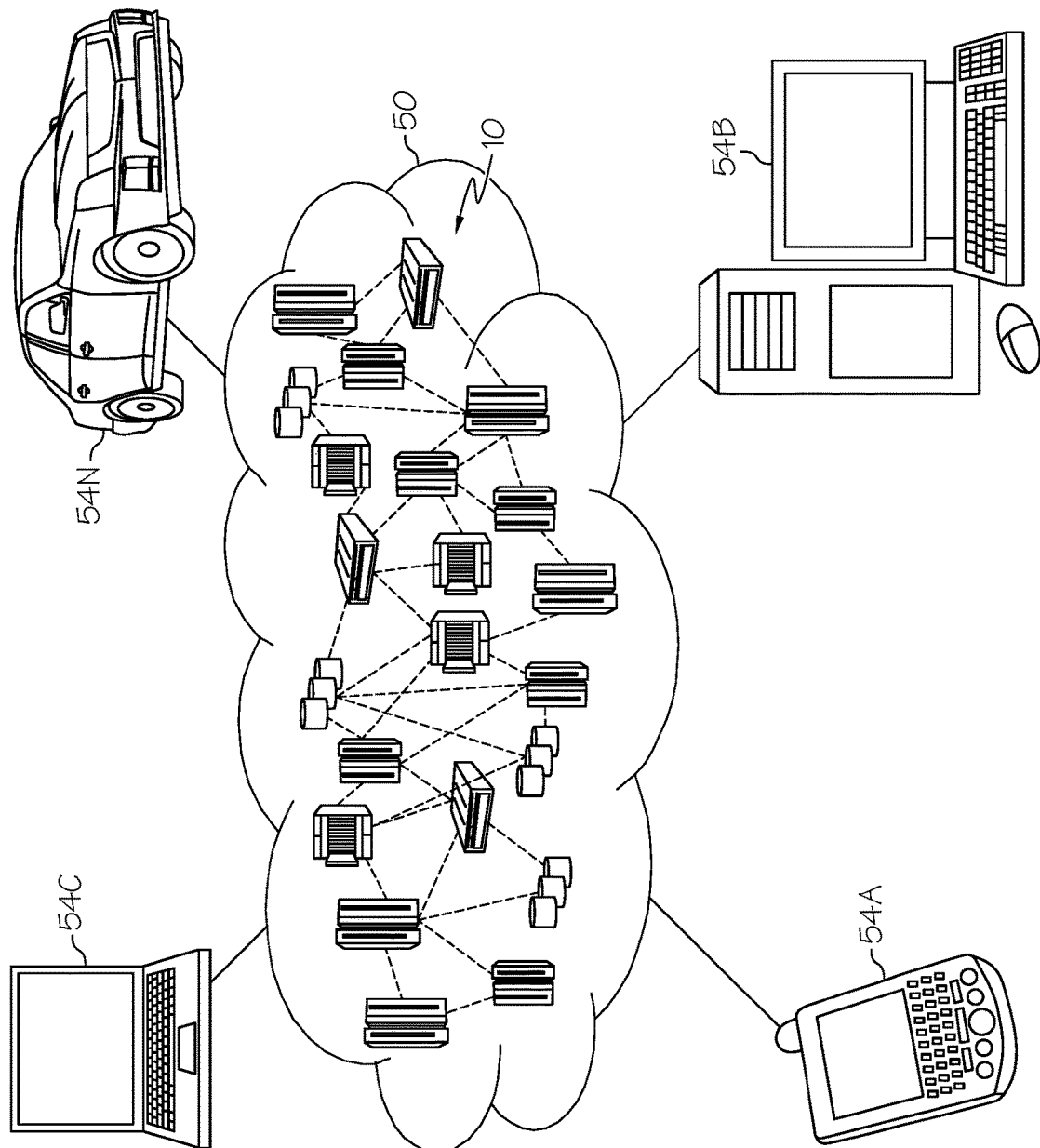
FIG. 8 depicts a cloud computing environment according to an embodiment of the present invention.

Referring now to FIG. 8 illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 8 are intended to be illustrative only and that computing nodes 10 and cloud computing environment 50 can communicate with any type of computerized device over any type of network and/or network addressable connection (e.g., using a web browser).

Figure 9:
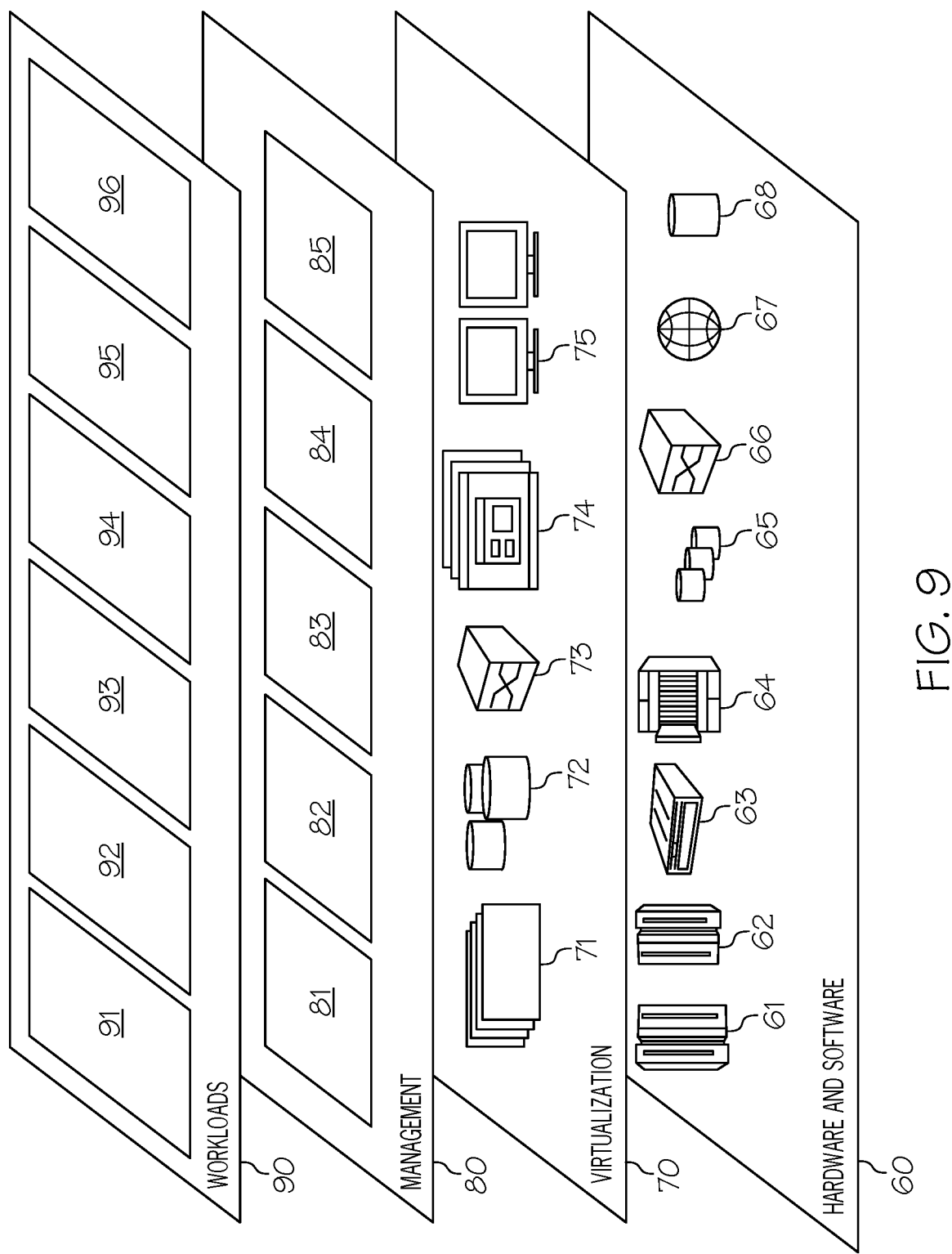
FIG. 9 depicts abstraction model layers of a cloud computer environment according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and content processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

In one or more embodiments of the present invention, any methods described in the present invention are implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, in one or more embodiments of the present invention any software-implemented method described herein is emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method comprising:
providing, by a supervisor computer, a trained content analyzer that accepts a piece of content, analyzes the piece of content, and generates a concept/emotion/sentiment/time tuple,
wherein the concept/emotion/sentiment/time tuple describes a concept, an emotion, a sentiment, and a time reference for the piece of content,
wherein the concept identifies an entity that is referenced in the piece of content,
wherein the emotion describes an expressed emotion of an author of the piece of content,
wherein the sentiment describes a sentiment of the author of the piece of content, and
wherein the time reference identifies a time reference within at least one statement of the piece of content;
receiving, by the supervisor computer, a first piece of content;
applying, by the supervisor computer, the trained content analyzer to the first piece of content to obtain a first concept/emotion/sentiment/time tuple describing a first concept, a first emotion, a first sentiment, and a first time reference for the first piece of content;
receiving, by the supervisor computer, a second piece of content;
applying, by the supervisor computer, the trained content analyzer to the second piece of content to obtain a second concept/emotion/sentiment/time tuple describing a second concept, a second emotion, a second sentiment, and a second time reference for the second piece of content;
comparing, by the supervisor computer, the first concept/emotion/sentiment/time tuple to the second concept/emotion/sentiment/time tuple to determine that the first concept matches the second concept and at least one of the first emotion, the first sentiment and the first time reference does not respectively match the second emotion, the second sentiment, and the second time reference;
in response to determining that the first concept matches the second concept and at least one of the first emotion, the first sentiment, and the first time reference does not respectively match the second emotion, the second sentiment, and the second time reference, determining an advanced emotion for the second piece of content, wherein the trained content analyzer is unable to recognize the advanced emotion, and
wherein the advanced emotion is at least one of irony, sarcasm, or hope; and
in response to determining the advanced emotion, activating, by the supervisor computer, a resource, wherein activation of the resource accommodates the advanced emotion.

2. The method of claim 1, further comprising:
inputting, by the supervisor computer, the first concept/emotion/sentiment/time tuple and the second concept/emotion/sentiment/time tuple into a neural network in order to determine the advanced emotion for the second piece of content.

3. The method of claim 1, wherein determining the advanced emotion for the second piece of content is performed using an emotion classifier based on manually created rules.

4. The method of claim 1, further comprising:
matching, by the supervisor computer, the second piece of content to a new author, wherein the resource being activated is a communication network that has been architected to provide a communication with the new author of the second piece of content whose emotion is the advanced emotion.

5. The method of claim 1, further comprising:
matching, by the supervisor computer, the second piece of content to a new author, and wherein the resource being activated is a mechanical device that has been designed to perform a physical action that ameliorates the advanced emotion in the new author.

6. The method of claim 1, further comprising:
matching, by the supervisor computer, the second piece of content to a new author, wherein the resource being activated is a software application that has been designed perform an action on a client computer used by the new author that ameliorates the advanced emotion in the new author.

7. The method of claim 6, further comprising:
presenting, by the supervisor computer, a link to the software application to the client computer;
receiving, by the supervisor computer, an activation signal of the link from the client computer; and
transmitting and activating, by the supervisor computer, the software application in the client computer in response to receiving the activation signal of the link from the client computer.

8. The method of claim 1, wherein the sentiment describes whether the author is in favor of the particular piece of the content, is opposed to the piece of content, or is neutral to the particular piece of content.

9. The method of claim 1, wherein the first piece of content and the second piece of content are both textual contents.

10. The method of claim 1, wherein the first piece of content is textual content and wherein the second piece of content is video content.

11. The method of claim 1, wherein the first piece of content is video content and wherein the second piece of content is textual content.

12. The method of claim 1, wherein the first piece of content and the second piece of content are both video contents.

13. The method of claim 1, wherein the first piece of content and the second piece of content are both authored by a same author.

14. The method of claim 1, wherein the first piece of content is authored by a first set of multiple authors, and wherein the second piece of content is authored by a new author that is not part of the first set of multiple authors.

15. A computer program product comprising:
one or more computer readable storage medium having program code embodied therewith, and wherein the program code is readable and executable by a processor to perform a computer-implemented method comprising:
providing, by a supervisor computer, a trained content analyzer that accepts a piece of content, analyzes the piece of content, and generates a concept/emotion/sentiment/time tuple,
wherein the concept/emotion/sentiment/time tuple describes a concept, an emotion, a sentiment, and a time reference for the piece of content,
wherein the concept identifies an entity that is referenced in the piece of content,
wherein the emotion describes an expressed emotion of an author of the piece of content, wherein the sentiment describes a sentiment of the author of the piece of content, and wherein the time reference identifies a time reference within at least one statement of the piece of content;

receiving, by the supervisor computer, a first piece of content;

applying, by the supervisor computer, the trained content analyzer to the first piece of content to obtain a first concept/emotion/sentiment/time tuple describing a first concept, a first emotion, a first sentiment, and a first time reference for the first piece of content;

receiving, by the supervisor computer, a second piece of content;

applying, by the supervisor computer, the trained content analyzer to the second piece of content to obtain a second concept/emotion/sentiment/time tuple describing a second concept, a second emotion, a second sentiment, and a second time reference for the second piece of content;

comparing, by the supervisor computer, the first concept/emotion/sentiment/time tuple to the second concept/emotion/sentiment/time tuple to determine that the first concept matches the second concept and at least one of the first emotion, the first sentiment and the first time reference does not respectively match the second emotion, the second sentiment, and the second time reference;

in response to determining that the first concept matches the second concept and at least one of the first emotion, the first sentiment, and the first time reference does not respectively match the second emotion, the second sentiment, and the second time reference, determining an advanced emotion for the second piece of content,
wherein the trained content analyzer is unable to recognize the advanced emotion, and
wherein the advanced emotion is at least one of irony, sarcasm, or hope; and in response to determining the advanced emotion, activating, by the supervisor computer, a resource, wherein activation of the resource accommodates the advanced emotion.

16. The computer program product of claim 15, wherein the method further comprises:
inputting the first concept/emotion/sentiment/time tuple and the second concept/emotion/sentiment/time tuple into a neural network in order to determine the advanced emotion for the second piece of content.

17. The computer program product of claim 15, wherein determining the advanced emotion for the second piece of content is performed using an emotion classifier based on manually created rules.

18. The computer program product of claim 15, wherein the method further comprises:
matching the second piece of content to a new author, wherein the resource being activated is a communication network that has been architected to provide a communication with the new author of the second piece of content whose emotion is the advanced emotion.

19. The computer program product of claim 15, wherein the method further comprises:
matching the second piece of content to a new author, and
wherein the resource being activated is a mechanical device that has been designed to perform a physical action that ameliorates the advanced emotion in the new author.

20. A computer system comprising:
one or more computer processors;
one or more computer readable storage media having computer readable program instructions stored on the one or more computer readable storage media for execution by at least one of the one or more computer processors, the stored program instructions execute a computer-implemented method comprising steps of:
providing, by a supervisor computer, a trained content analyzer that accepts a piece of content, analyzes the piece of content, and generates a concept/emotion/sentiment/time tuple,
wherein the concept/emotion/sentiment/time tuple describes a concept, an emotion, a sentiment, and a time reference for the piece of content,
wherein the concept identifies an entity that is referenced in the piece of content,
wherein the emotion describes an expressed emotion of an author of the piece of content,
wherein the sentiment describes a sentiment of the author of the piece of content, and
wherein the time reference identifies a time reference within at least one statement of the piece of content;

receiving, by the supervisor computer, a first piece of content;

applying, by the supervisor computer, the trained content analyzer to the first piece of content to obtain a first concept/emotion/sentiment/time tuple describing a first concept, a first emotion, a first sentiment, and a first time reference for the first piece of content;

receiving, by the supervisor computer, a second piece of content;

applying, by the supervisor computer, the trained content analyzer to the second piece of content to obtain a second concept/emotion/sentiment/time tuple describing a second concept, a second emotion, a second sentiment, and a second time reference for the second piece of content;

comparing, by the supervisor computer, the first concept/emotion/sentiment/time tuple to the second concept/emotion/sentiment/time tuple to determine that the first concept matches the second concept and at least one of the first emotion, the first sentiment and the first time reference does not respectively match the second emotion, the second sentiment, and the second time reference;

in response to determining that the first concept matches the second concept and at least one of the first emotion, the first sentiment, and the first time reference does not respectively match the second emotion, the second sentiment, and the second time reference, determining an advanced emotion for the second piece of content,
wherein the trained content analyzer is unable to recognize the advanced emotion, and
wherein the advanced emotion is at least one of irony, sarcasm, or hope; and in response to determining the advanced emotion, activating, by the supervisor computer, a resource, wherein activation of the resource accommodates the advanced emotion.

* * * * *